United States Patent [19]
Bauzil

[11] 3,967,453
[45] July 6, 1976

[54] CONNECTING CHANNEL BETWEEN TWO DIFFERENT WATER LEVELS

[76] Inventor: Vincent Bauzil, 4, rue Sall l'Eveque, 34-Montpellier, France

[22] Filed: Sept. 18, 1973

[21] Appl. No.: 398,472

[52] U.S. Cl. ............................................... 61/30
[51] Int. Cl.² ......................... E02B 3/10; E02B 7/00
[58] Field of Search .............. 61/1 R, 2, 7, 8, 9, 61/29, 30, 31, 32, 3, 4

[56] References Cited
UNITED STATES PATENTS

| | | | |
|---|---|---|---|
| 1,605,888 | 11/1926 | Beaubien et al. | 61/7 |
| 2,609,666 | 9/1952 | Mesnager | 61/30 |
| 3,246,474 | 4/1966 | Mesnager | 61/30 |
| 3,299,640 | 1/1967 | Nielsen | 61/3 |
| 3,323,310 | 6/1967 | Arpin | 61/3 |
| 3,597,926 | 6/1974 | Riddett | 61/30 |

FOREIGN PATENTS OR APPLICATIONS

| | | | |
|---|---|---|---|
| 954,935 | 4/1964 | United Kingdom | 61/30 |
| 212,138 | 9/1968 | U.S.S.R. | 61/3 |

*Primary Examiner*—Philip C. Kannan
*Attorney, Agent, or Firm*—Craig & Antonelli

[57] ABSTRACT

A connecting channel arrangement between two levels or planes of water of different vertical height. A channel connecting the two levels is partially obstructed by a number of flexible members which constitute obstacles to the free flow of the water in order to obtain a significant reduction of the rate of flow and of the flow velocity, while these flexible members are able nonetheless to deflect out of the way of the passage of floating devices such as boats and debris. These flexible members each have one end connected to the bed of the channel and extend through the water in the channel in a direction transverse to the flow direction. Preferred embodiments of the flexible members are constructed as hollow rubber tubes which are connected to a compressed fluid supply for controlling their flexibility.

32 Claims, 10 Drawing Figures

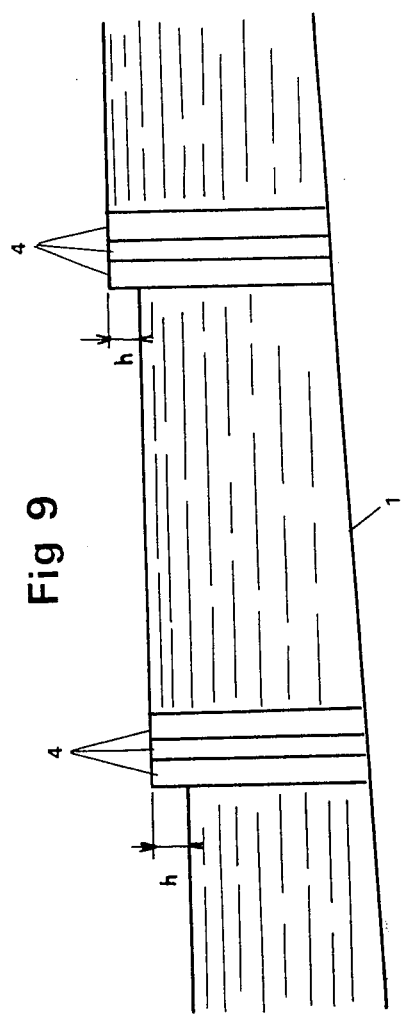
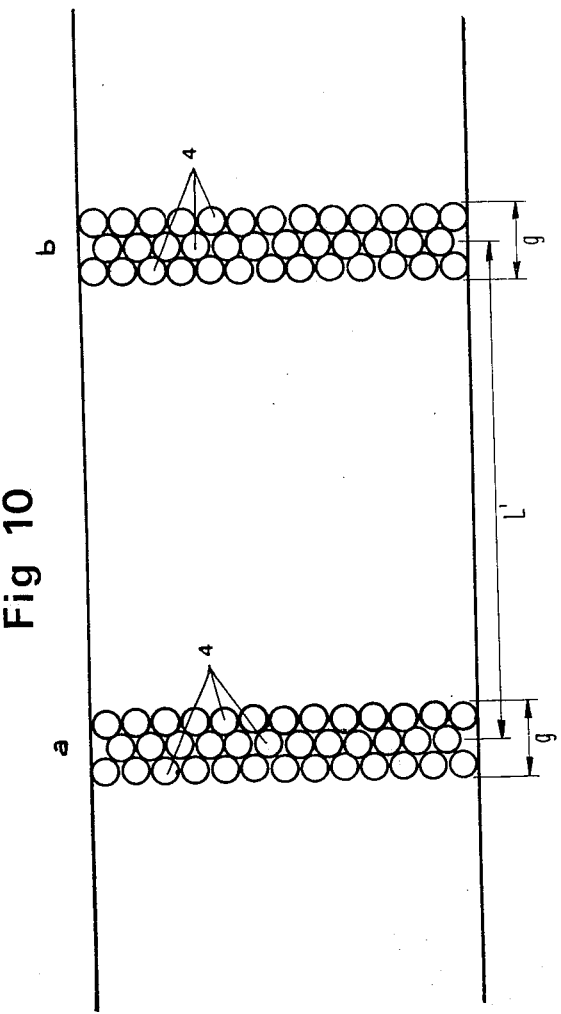
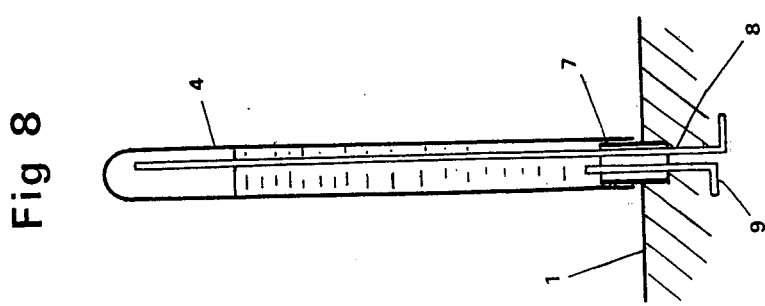

CONNECTING CHANNEL BETWEEN TWO DIFFERENT WATER LEVELS

BACKGROUND AND SUMMARY OF THE INVENTION

The present invention relates to a connecting channel arrangement between two levels or water planes of different vertical height such that a permanent continuous communication can be assured between these two water planes.

On streams and on navigable channels the existence of water planes of different levels, or heights, results generally from the presence of a dam or weir retaining the upstream level. This dam or weir may be passed over or cleared entirely by the water flowing toward the downstream level or it may comprise to that end a less high portion forming a waste weir sluice gate system which permits control of the flow. Whatever the type thereof, these dams or weirs constitute obstacles to the navigation and to the free circulation of the water fauna between the two levels. It has been contemplated to solve the navigation problem by locks provided with lock gates and sluice gates which permit boats to pass from one level to the other by causing the water of the lock chamber comprised between two lock gates to be varied. These locks which are relatively long and delicate to maneuver are complex and costly structures, necessitating a constant maintenance and constant supervision. These locks also are an obstacle to the circulation of the aquatic fauna if their manuevers are not frequent.

The present invention contemplates an arrangement which obviates the above-discussed inconveniences by means of a connecting channel of less costly construction, of more simple supervision and maintenance which permits the direct passage of floating devices and the free circulation of the water fauna from one level to the other.

The present invention relates to a connecting channel between two levels or water planes of different height, characterized in that the connecting channel is obstructed partially by multiple, flexible devices forming an obstacle to the free flow of the water in the channel. The flexible devices thus assure a significant reduction of the flow and of the speed of flow of the water which would establish itself otherwise within the free channel, yet permitting a permanent connection between the two levels. The flexibility of these devices nonetheless permits the same to get or deflect out of the way of the passage of floating objects, thus authorizing the direct passage of boats or large drifting debris.

In several preferred embodiments of the present invention, these flexible devices are distributed over the entire length of the channel to assure a uniform and continuous dissipation of the pressure exerted by the upstream weir to the entry of the channel. In other preferred embodiments the flexible devices are grouped along transverse lines to form a plurality of spaced weirs along the length of the channel with a small height difference in water level at each weir. The flexible devices are preferably of finger-like shape and extend vertically and/or horizontally across the bed of the channel.

These and further objects, features and advantages of the present invention will become more apparent from the following description when taken in connection with the accompanying drawing which shows, for purposes of illustration only, several embodiments in accordance with the present invention.

BRIEF DESCRIPTION OF THE DRAWINGS

FIG. 8 is a schematic view of a flexible finger-like member according to the present invention; and FIGS. 9 and 10 are, respectively, schematic longitudinal and plan views illustrating another arrangement of the flexible members in a channel according to the present invention.

DETAILED DESCRIPTION OF THE DRAWINGS

Figure 1:
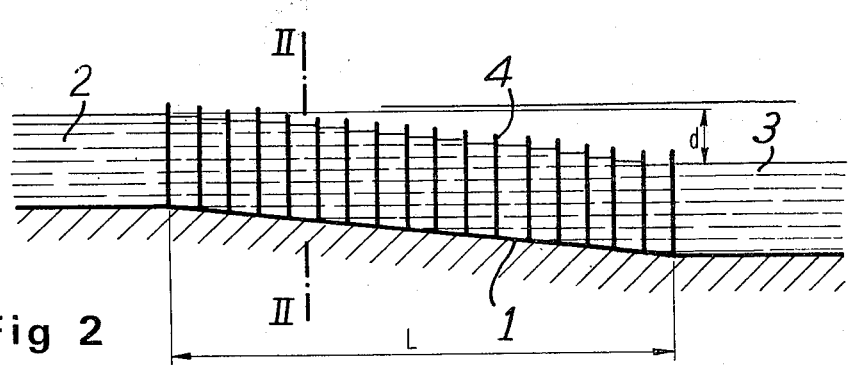
FIG. 1 is a schematic longitudinal cross-sectional view of an inclined connecting channel with its flexible members braking the flow in accordance with the present invention.

Referring now to the drawings wherein like reference numerals are used throughout the various views to designate like parts, and more particularly to FIG. 1, the connecting channel according to the present invention comprises essentially an inclined channel 1 connecting an upstream level 2 to a downstream level 3 of different vertical height and in which are disposed vertical finger-like devices 4 fixed to the bottom of the channel. These members 4 are distributed over the entire length of the channel and they present a height, a cross-section and a concentration per unit of surface such that for a given water draft, one obtains:

a significant braking of the flow, therefore a total significant reduction of the rate of flow which would otherwise establish itself in the free channel;

a uniform and continuous dissipation of the load exerted at the inlet of the channel by the upstream level in such a manner as to have at each point of the channel a slight flow velocity which avoids the dangers of erosion.

These finger-like obstacles possess nonetheless a flexibility and elastic characteristics such that they may be deformed to free the passage to a floating device 5 or to get out of the way to permit in particular the periodic evacuation toward the downstream of floating debris and to avoid clog-ups.

For the navigation, the structure thus permits a direct passage of the boats 5 toward the downstream or toward the upstream whereby the boats are retained or drawn according to the specific case by means of a windlass 6 during the passage through the channel. With respect to the aquatic fauna, it may freely circulate from one level to the other by passing around the braking obstacles 4.

Figure 5:
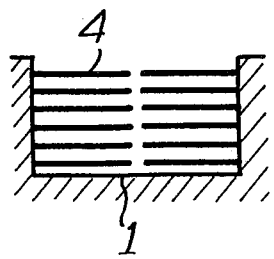
FIGS. 5 and 6 are schematic transverse cross-sectional views of two modified embodiments illustrating other arrangements of the flexible obstacles in accordance with the present invention.
Figure 6:
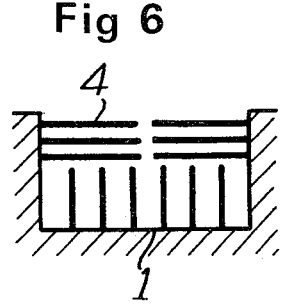
Figure 7:
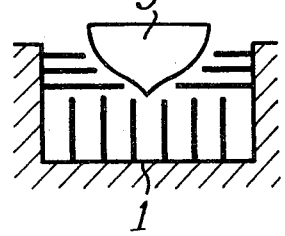
FIG. 7 is a schematic transverse cross-sectional view illustrating the passage of a boat in the channel of FIG. 6.

FIGS. 5, 6 and 7 illustrate that finger-like flexible obstacles may be disposed horizontally or in part horizontally and in part vertically. They are fixed depending on the particular case to the bottom or to the lateral walls of the channel.

FIG. 8 illustrates the construction of a flexible device or member actuated in such manner as to render its degree of flexibility controllable. Such flexible members may:

acquire a relative rigidity which permits the same to maintain themselves erected in the current without forming an excessive resistance to the passage of the boats;

be more or less relaxed or released with a view either to reduce the friction exerted by them on the passing hull of boats or to favor disengagement of debris of all nature which they might have retained and their disentrainment toward the downstream owing to the formation of a sweeping current of sufficient velocity.

To that effect, the flexible members 4 are formed of a hollow finger-like body, for example, tubular, of flexible material such as rubberized fabric, fixed in their lower portion to a joint connection 7 traversed by a pipe system 8 connected to a source of compressed air and by a pipe system 9 connected to a source of water under pressure. The portion of pipe system 8 in the interior portion of member 4 is flexible so as to permit intentional collapse of tube 4 for removing debris or the like. The connection 7 is fixed to the floor 1 of the channel. This installation enables the control, by inflation or deflation of the hollow flexible members, their erection or their relaxation. During the inflation, this erection is proportional to the value of the pressure and it may thus be regulated at will.

FIGS. 9 and 10 illustrate another preferred arrangement of the distribution of the flexible members 4 in the channel.

Figure 2:
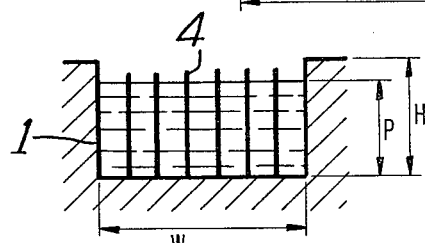
FIG. 2 is a schematic transverse cross-sectional view taken alone line II—II of FIG. 1.
Figure 3:
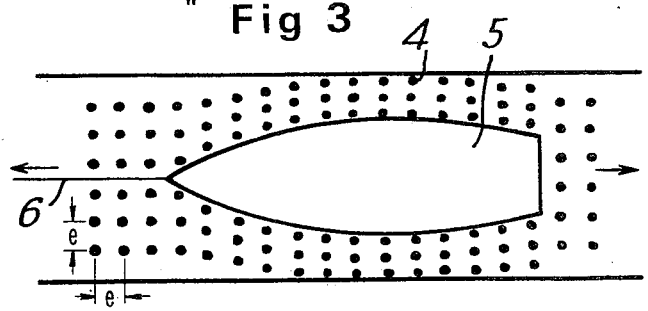
FIG. 3 is a schematic plan view of the channel arrangement of FIG. 2 at the instant when a boat passes through the same.
Figure 4:
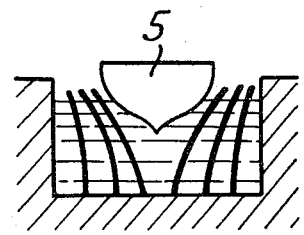
FIG. 4 is a schematic transverse cross-sectional view of the channel of FIG. 3 at the instant of the passage of a boat.

With a distribution of the flexible members such as described and illustrated in FIGS. 1 to 3, the flow of the upstream level toward the downstream level is exclusively braked by the implantation into the connecting channel of flexible members 4 uniformly distributed which assure a continuous dissipation of the total pressure load available such that the speed and the rate of flow are maintained within the limits permissive respectively by the needs of the navigation and the conditions of alimentation of the waterway.

The illustrated arrangement of FIGS. 9 and 10 aims at permitting a complete stoppage of the flow by flexible erectile members of an analogous nature to those described hereinabove with respect to FIGS. 1 to 7, but arranged differently, a static water line in step form being then substituted to the dynamic line of uniform flow which would result in the arrangement of FIGS. 1 to 7.

The erectile flexible members 4 of FIGS. 9 and 10 are grouped in such a manner that by their juxtaposition at a suitable number of closely spaced transverse lines $a$, $b$ . . . they form successive transverse weirs or dams which assure, at right angles of each of the steps of the stairway, the desired difference in level "$h$" with a sufficient tightness, the independence, the elasticity and the flexibility of these members permitting the same not to constitute an obstacle to the passage of boats and large items of debris.

Thus, an opened connecting channel equipped with flexible members uniformly distributed in accordance with FIGS. 9 and 10 may be arranged along the paths of navigation whose alimentation with water is parsimoniously assured. A series of micro levels whose modest difference in level (some decimeters) results from the juxtaposition of the flexible members 4 across which the boats are susceptible to pass by deflection of the members 4.

The flexible members 4 constituting these weirs or dams of slight differences in level (FIGS. 9 and 10) are composed of hollow finger-like bodies (tubular or non tubular) whose erection is determined by injection of water under pressure or compressed air or both in a manner similar to that described above with respect to FIG. 8.

The pressure on the inside of these hollow bodies of an individual group or cluster forming a respective weir in the FIGS. 9 and 10 arrangement may, in case of need, be reduced during the time and within the measure just necessary to facilitate the clearance by a boat of the dam or weir which they form while limiting also as narrowly as possible the corresponding rate of leakage.

In all of the preferred embodiments with hollow inflatable flexible members, a cleaning or purging of debris, including small items that were of insufficient size and weight to traverse the channel, can be effected by deflating the flexible members by a certain amount.

In the embodiment illustrated in FIGS. 1–4, (similar range of dimensions for FIGS. 5–7) the following exemplary dimensions may be utilized:

| | | |
|---|---|---|
| Width of channel | W | 5 meters |
| Height of channel | H | 3 meters |
| Water depth | P | 2.5 meters |
| Length of inclined portion | L | 15 meters |
| Level difference between 2 and 3 (5% slope of inclined portion) | d | .75 meters |
| Transverse and axial spacings | e | 30 centimeters |
| Inflated length and diameter respectively of each member 4 | 2.7 — | meters; 12 centimeters |

In the embodiment illustrated in FIGS. 9 and 10, the following exemplary dimensions may be utilized:

| | | |
|---|---|---|
| Width of each row a, b | g | 1 meter |
| Length between rows | L' | 12 meters |
| Height of water levels | h | 30–36 centimeters |
| Channel width of 6 meters and average water depth of 3 meters | | |
| Inflated diameter of each member 4 – 40 centimeters (adjacent members 4 in contact when inflated) | | |

The above specific dimensional examples given herein have been included to assist in an understanding of the invention and are not intended to limit the scope of the present invention, it being understood that variations from these dimensions may be made to effect different channel flows.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A connecting channel arrangement for connecting two different water levels; said arrangement comprising:

a channel means extending between said two different water levels, a plurality of flexible finger-like means arranged in said channel means for obstructing free flow of water in order to obtain a reduction in the water flow rate and velocity through said channel means, said flexible means being sufficiently deflectible to permit passage therebetween of floating articles such as boats and debris, and means for controlling the flexibility of each of said plurality of flexible finger-like means such that the deflection of each of said plurality of flexible finger-like means is regulated between a maximum rigidity obstructing free flow of water through said channel means and a minimum rigidity permitting said passage of floating articles therethrough.

2. An arrangement according to claim 1, wherein said flexible means are arranged along a plurality of spaced lines extending transverse to the flow through said channel means to form successive flexible weirs which weirs substantially preclude passage therethrough of said water and form a plurality of separate short levels of slight difference in water level along the length of the channel means.

3. An arrangement according to claim 1, wherein said flexible means are deflectable in all directions.

4. An arrangement according to claim 1, wherein said flexible means are juxtaposed in transverse and longitudinal directions of said channel means.

5. An arrangement according to claim 1, wherein said flexible means are juxtaposed in transverse and longitudinal directions along the length of said channel means.

6. An arrangement according to claim 1, wherein said flexible means are deflectable in the direction of water flow through said channel means.

7. An arrangement according to claim 1, wherein said flexible means are distributed substantially uniformly along the length of the channel means so as to obtain a uniform and continuous dissipation of the pressure energy difference between the two different water levels.

8. An arrangement according to claim 2, wherein said flexible means are mutually spaced apart.

9. An arrangement according to claim 1, wherein each of said flexible means is a finger-like elongated member which has one end fixed to at least one of bottom wall portions and side wall portions of the channel means, the other end of said elongated member extending transversely to the direction of flow through said channel means.

10. An arrangement according to claim 9, wherein each of said elongated members extends in one of horizontal and vertical directions.

11. An arrangement according to claim 9, wherein each of said elongated members extends in the vertical direction.

12. An arrangement according to claim 9, wherein each of said elongated members extends in the horizontal position.

13. An arrangement according to claim 9, wherein some of said elongated members extend in the horizontal direction and others of said elongated members extend in the vertical direction.

14. An arrangement according to claim 13, wherein said flexible means are distributed substantially uniformly along the length of the channel means so as to obtain a uniform and continuous dissipation of the pressure energy difference between the two different water levels.

15. A connecting channel arrangement for connecting two different water levels; said arrangement comprising:

a channel means extending between said two different water levels, and a plurality of flexible finger-like means arranged in said channel means for obstructing free flow of water in order to obtain a reduction in the water flow rate and velocity through said channel means, said flexible means being sufficiently deflectible to permit passage therebetween of floating articles such as boats and debris, wherein each of said flexible means are formed as hollow finger-like elongated members, and wherein compressed fluid supply means are connected to said hollow elongated members for controlling their inflation with a consequent control of the flexibility thereof.

16. An arrangement according to claim 15, wherein said compressed fluid supply means includes means for supplying water under pressure to said hollow elongated members.

17. An arrangement according to claim 15, wherein said hollow elongated members are made of rubber and are closed at free ends thereof and fixed over coupling pipe means at opposite fixed ends thereof along side wall portions of said channel means.

18. An arrangement according to claim 15, wherein each of said elongated members extends in one of horizontal and vertical directions.

19. An arrangement according to claim 15, wherein each of said elongated members extends in the vertical direction.

20. An arrangement according to claim 15, wherein each of said elongated members extends in the horizontal direction.

21. An arrangement according to claim 15, wherein some of said elongated members extends in the horizontal direction and others of said elongated members extend in the vertical direction.

22. An arrangement according to claim 15, wherein said flexible means are deflectable in the direction of water flow through said channel means.

23. An arrangement according to claim 15, wherein said flexible means are mutually spaced along the length of said channel means.

24. An arrangement according to claim 23, wherein said flexible means are uniformly spaced along the length of said channel means.

25. An arrangement according to claim 15, wherein said compressed fluid supply means includes means for supplying compressed air to said hollow elongated members.

26. An arrangement according to claim 25, wherein said compressed fluid supply means includes means for supplying water under pressure to said hollow elongated members.

27. An arrangement according to claim 26, wherein said compressed fluid supply means includes separate pipe means opening into each of said hollow elongated members for said compressed air and said water under pressure.

28. An arrangement according to claim 15, wherein each of said hollow finger-like elongated members has one end fixed to at least one of the bottom wall portions and side wall portions of the channel means, the other end protruding through the water in a direction transverse to the flow direction through said channel means.

29. An arrangement according to claim 28, wherein each of said hollow members is maintained in position only by the inflation pressure therein supplied by said compressed fluid supply means and the fixed connection of the one end at said side wall portions.

30. An arrangement according to claim 29, wherein said flexible means are distributed substantially uniformly along the length of the channel means so as to obtain a uniform and continuous dissipation of the pressure energy difference between the two different water levels.

31. An arrangement according to claim 29, wherein said flexible means are arranged along a plurality of spaced lines extending transverse to the flow through said channel means to form successive flexible weirs which weirs substantially preclude passage therethrough of said water and form a plurality of separate short levels of slight difference in water level along the length of the channel means.

32. An arrangement according to claim 31, wherein all of said hollow elongated members extend in the vertical direction from a fixed connection at the bottom of the channel to a position even with the immediately adjacent upstream water level at the weir being formed thereby.

* * * * *